July 7, 1970            A. S. ODEH            3,519,077
OIL RECOVERY PROCESS
Filed June 21, 1968
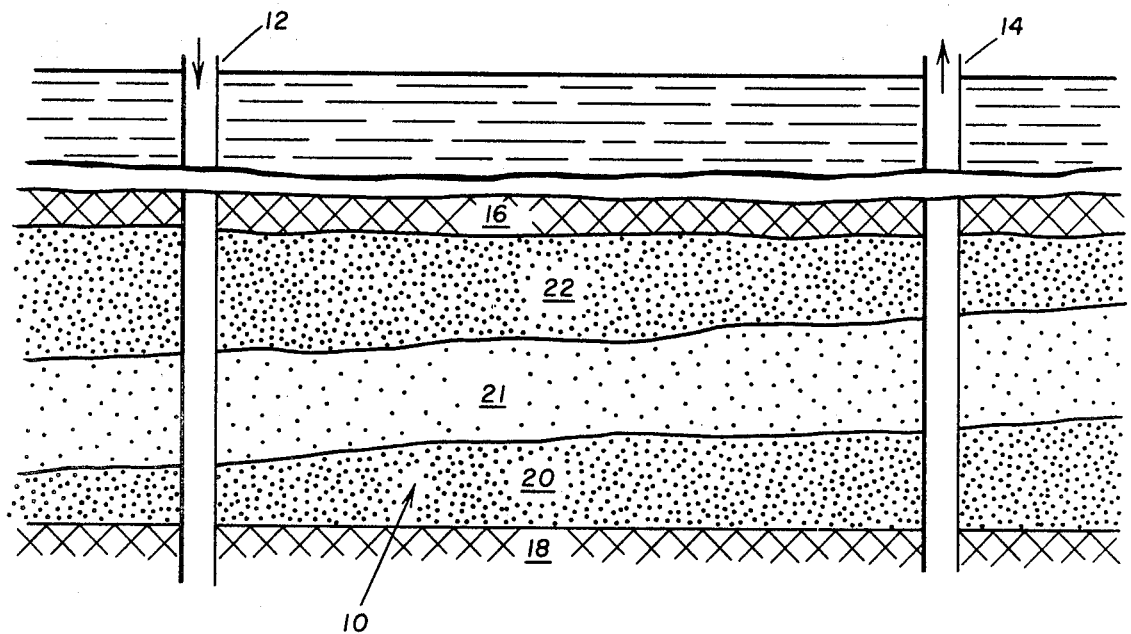
AZIZ S. ODEH
INVENTOR
BY *William R. Johnson*
ATTORNEY 3,519,077
OIL RECOVERY PROCESS
Aziz S. Odeh, Dallas, Tex., assignor to Mobil Oil Corporation, a corporation of New York
Filed June 21, 1968, Ser. No. 739,105
Int. Cl. E21b 43/22
U.S. Cl. 166—274                           3 Claims

ABSTRACT OF THE DISCLOSURE

This specification discloses a secondary oil recovery technique. In carrying out the invention an aqueous shear-thinning liquid is first injected into the reservoir and then followed by an aqueous shear-thickening liquid. Preferably, the shear-thinning liquid is injected at least until breakthrough occurs at the production system, at which time injection of the shear-thickening liquid is initiated.

BACKGROUND OF THE INVENTION

This invention relates to the recovery of oil from subterranean oil reservoirs and, more particularly, to new and improved secondary recovery operations utilizing shear-thinning and shear-thickening liquids.

In the recovery of oil from oil-bearing reservoirs it usually is possible to recover only a minor portion of the original oil in place by the so-called primary recovery methods which utilize only the natural forces present in the reservoir. Thus, a variety of supplemental recovery techniques have been employed in order to increase the recovery of oil from subterranean reservoirs. In these supplemental techniques, which commonly are referred to as secondary recovery operations although in fact they may be primary or tertiary in sequence of employment, fluid is introduced into the reservoir in order to displace the oil therein to a suitable production system through which the oil may be withdrawn to the surface of the earth. The displacing medium may be a gas, an aqueous liquid such as fresh water or brine, an oil-miscible liquid such as butane, or a water and oil-miscible liquid such as an alcohol. Generally, the most promising of the secondary recovery techniques involves the injection into the reservoir of an aqueous flooding medium, either alone or in combination with other fluids.

One difficulty which is often encountered in secondary recovery operations is the relatively poor volumetric sweep efficiency of the injected displacing liquid; that is, the tendency of the displacing liquid to channel through certain portions of the reservoir and to bypass other portions. Such poor volumetric sweep efficiency is occasioned by differences between the viscosity of the injected displacing medium and the in-situ reservoir oil and also by permeability variations within the reservoir. The reservoir may comprise a plurality of fairly-well defined zones of widely diverse permeabilities. The injected displacing fluid preferentially flows through the more permeable zones of the reservoir thus leading to premature breakthrough of the displacing fluid at the production well or wells.

Various techniques have been proposed in order to improve the volumetric sweep efficiency of the injected displacing fluid and thus avoid premature breakthrough. For example, it has been proposed to selectively inject plugging agents into the more permeable zones of the reservoir in order to effect an overall decrease in permeability variation. Another technique for increasing sweep efficiency involves the utilization of a relatively viscous displacing liquid. Thus, in waterflooding operations, for example, thickening agents have been added to at least a portion of the flood water in order to increase the viscosity thereof. The viscosity of the displacing liquid may be increased prior to its injection into the reservoir. Alternatively, the viscosity of the liquid displacing medium may be increased in-situ, in order to avoid a reduction in injectivity at the injection wells. For example, in U.S. Pat. No. 3,208,518 to John T. Patton, there is disclosed a waterflooding process in which the viscosity of the aqueous displacing medium is increased in-situ through the use of high molecular weight ionic polymers under controlled pH conditions. Another technique whereby the viscosity of the aqueous displacing medium may be increased in-situ involves the injection of a shear-thinning liquid. For example, as disclosed in U.S. Pat. No. 3,292,696 to B. B. Sandiford, an aqueous solution of hydroxy-ethylcellulose which exhibits a relatively low viscosity at high shear rates may be injected in order to displace oil from the formation. Also, as disclosed for example in U.S. Pat. No. 3,315,743 to M. K. Abdo et al., it has been proposed to inject an aqueous shear-thickening liquid in a waterflooding procedure.

SUMMARY OF THE INVENTION

In accordance with the present invention, there is provided a new and improved secondary recovery method utilizing the sequential injection of shear-thinning and shear-thickening liquids. The invention is practiced in a subterranean oil reservoir which is penetrated by spaced injection and production systems defining a recovery zone of the reservoir. In carrying out the invention, an aqueous shear-thinning liquid is injected into the reservoir via the injection system in order to displace oil within the recovery zone in the direction of the production system. Thereafter, an aqueous shear-thickening liquid is injected into the reservoir through the injection system. Preferably, the shear-thinning liquid is injected at least until breakthrough thereof occurs at the production system, at which time the injection of the shear-thickening liquid is initiated. During the injection of the shear-thinning and shear-thickening liquids in accordance with the invention, oil is recovered from the production system as in conventional waterflooding operations.

BRIEF DESCRIPTION OF THE DRAWINGS

The drawing is a vertical section of an oil reservoir, taken between injection and production wells, showing exemplary permeability variations within the reservoir.

DESCRIPTION OF SPECIFIC EMBODIMENTS

The present invention is carried out in a recovery zone of a subterranean oil-bearing reservoir. As will be understood by those skilled in the art, by the term "recovery zone," as used herein and in the appended claims, is meant that portion of a reservoir through which oil is displaced to the production system by the injected displacing medium. The injection and production systems each may comprise one or more wells extending from the surface of the earth into the subterranean oil reservoir and such wells may be located and spaced from one another in any desired pattern. For example, the so-called "line flood" pattern may be utilized, in which case the injection and production systems comprise rows of wells spaced from one another. In this type of pattern the recovery zone, as defined by the spaced rows of injection and production wells, generally will be that portion of the reservoir underlying the area between these spaced rows. Exemplary of other patterns which may be used is the so-called "circular flood" pattern in which the injection system comprises a central injection well and the production system comprises a plurality of production wells spaced about the injection well. Of course, the injection and production systems each may consist of only a single well in which case the recovery zone, as defined by the spaced injection and production wells, will be the portion of the reservoir underlying a generally elliptical area between these wells which is subject to the displacing action of the injected flooding medium. The above and other patterns are well known to those skilled in the art and for a more detailed description of such patterns reference is made to Uren, L. C., Petroleum Production Engineering—Oil Field Exploitation, 2nd ed., McGraw-Hill Book Company, Inc., New York and London, 1939, and more particularly to the section entitled "The Water Flooding Process," appearing at pages 444–459.

Turning now to the drawing, there is illustrated an oil reservoir 10 penetrated by spaced injection and production wells 12 and 14, respectively. While, for the purpose of simplicity in describing the invention, only one injection well and one production well are shown, it will be recognized that in practical applications of the invention a plurality of such wells may be, and in most cases will be, utilized. Thus, the wells 12 and 14 may each be considered to be located in rows of spaced injection and production wells, as in the line flood pattern described above. Also, the injection well 12 may be considered to be the central well in a circular flood pattern, e.g., a five-spot or nine-spot pattern, and the production well 14 one of the peripheral wells.

The reservoir 10 is bounded by layers 16 and 18 of relatively impermeable rock which overlie and underlie the reservoir. The reservoir is shown as being comprised of a number of fairly-well defined zones 20, 21, and 22 which differ considerably from one another in permeability in the direction of flow from the injection well to the production well. These zones may, of course, slope or have various curvatures, but typically they extend generally parallel to one another as shown. Some of the zones may be discontinuous; that is, they may terminate or begin at various locations as viewed in the direction of flow. In addition, the several zones may be in fluid communication with one another such that cross-flow between adjacent zones occurs throughout their extent or they may be separated by strata such as shale layers of very little or no permeability such that no cross-flow between adjacent zones occurs. As a practical matter, the permeability stratification of a typical oil reservoir will fall between these two extremes such that some cross-flow will occur between adjacent zones. Also, while only vertical permeability variation is shown in the reservoir 10, it will be recognized that the reservoir may exhibit horizontal permeability variation. That is, a horizontal section through the reservoir may reveal zones of diverse permeabilities.

Of the reservoir zones illustrated, those indicated by reference numerals 20 and 22 are considered to be zones of relatively low permeability with the zone 21 being a zone of relatively high permeability. Each of the reservoir zones 20, 21, and 22 contains oil which is desired to be displaced to the production well 14 by injecting a suitable fluid through the injection well 12. It will readily be recognized that upon injecting a displacing fluid through the well 12, the fluid will flow preferentially through the zone 21 of high permeability with the result that relatively rapid displacement occurs therein as compared with the low permeability zones 20 and 22. Thus, the high permeability zone 21 will be "swept out" and the displacing fluid will break through at the production well 14 long before the injected displacing fluid is moved completely through the low permeability zones 20 and 22.

In recovering oil in accordance with the present invention, an aqueous shear-thinning liquid is first injected through the injection well 12 and into the reservoir 10 in order to displace oil therein in the direction of the production well. As will be understood by those skilled in the art, by the term "shear-thinning liquid" is meant a liquid which exhibits a decrease in viscosity with an increase in shear rate. The property of shear-thinning thus enables a liquid to develop a relatively low viscosity when subjected to a high rate of shear in a subterranean formation. Such a high shear rate is induced, for example, when the liquid flows from the injection well into the reservoir. Due to the radial flow geometry attendant to the movement of the liquid between the formation and the well, the flow velocity and shear rate are much higher immediately adjacent the well than at more remote locations deeper into the formation. Thus, the effect of shear thinning on viscosity during flow through a formation is confined to a relatively small area immediately adjacent the injection well and beyond this area the shear rate is too small to exert a significant effect on the viscosity of the shear-thinning liquid. In practically all cases a shear-thinning liquid will behave substantially like a Newtonian fluid at distances beyond about twenty feet from the injection well.

By injecting a shear-thinning liquid, the preferential flow of the displacing liquid through the more permeable zone, commonly termed "flow stratification," is seriously aggravated. However, at the same time the injectivity of the displacing liquid into the formation is greatly enhanced over that which would be obtained with a Newtonian fluid exhibiting the same viscosity as the shear-thinning liquid at a near-zero shear rate. This increase in injectivity results in much faster oil recovery than would be obtained through the use of a Newtonian liquid of comparable viscosity.

The shear-thinning liquid may be injected in any suitable amount during this initial phase of the invention. It is preferred in carrying out the invention to continue the injection of the shear-thinning liquid at least until breakthrough thereof occurs at one or more of the wells comprising the production system. Such breakthrough normally can be recognized by a fairly abrupt increase in the water-oil ratio at a production well. However, if desired, a suitable tracer such as a radioactive material may be incorporated in the initial portion of the shear-thinning liquid and the production effluent from the production wells then monitored with regard to the tracer. Even after breakthrough occurs it many times will be desirable to continue the injection of the shear-thinning liquid until such time as the water-oil ratios at the wells comprising the production system increase to such an extent as to make further oil recovery inefficient or uneconomical. Alternatively, injection of the shear-thinning liquid may be terminated prior to observing breakthrough at a production well.

After injecting the desired amount of shear-thinning liquid, this step is terminated and an aqueous shear-thickening liquid is injected through the injection system and into the reservoir. By the term "shear-thickening liquid" is meant a liquid which exhibits an increase in viscosity with increasing shear rate. Similarly as described above with regard to the shear-thinning liquid, the effect of shear-thickening on viscosity during flow through the formation is limited to a relatively small portion of the formation immediately adjacent the injection well. Thus, the property of shear-thickening tends to decrease the injectivity of the liquid as it is introduced from the well into the adjacent formation. This effect is particularly pronounced in the high permeability zone 21 from which a disproportionately high amount of oil has been displaced relative to that displaced from low permeability zones 20 and 22. In this regard, the previously injected shear-thinning liquid will have invaded zone 21 by a disproportionately large amount resulting in a greater increase in water saturation and, therefore, greater relative permeability to water in zone 21 than in zones 20 and 22. Because of this increase in relative permeability to water within zone 21 and also because of the innate differences in absolute permeability between zone 21 and zones 20 and 22, the aqueous shear-thickening liquid will tend to flow for any given pressure differential at a greater velocity through zone 21 than through zones 20 or 22. This will be reflected in an increased shear rate for the liquid flowing through zone 21 with the result that the shear-thickening liquid will develop a higher viscosity in zone 21 than in zones 20 or 22, improving the flow stratification within the reservoir 10. Stated otherwise, the ratio of injectivity into zone 21 to the injectivity into zones 20 and 22 will be significantly less than the ratio of the permeability of zone 21 to the permeability of zones 20 and 22, with the result that the tendency of the injected liquid to selectively finger through zone 21 will be reduced. This, of course, will result in a less erratic vertical profile of the flood front of the shear-thickening liquid as it advances through the formation with the attendant result that a greater over-all amount of oil will be recovered from the formation for a given volume of injected fluids.

The aqueous shear-thinning and shear-thickening liquids utilized in the present invention may be formed by treating water as is used in conventional waterflooding operations with appropriate additives. Suitable shear-thinning additives which may be utilized in the present invention are polyglucosylglucans such as disclosed in U.S. Pat. No. 3,372,749 to S. A. Williams; hydroxyethylcellulose such as disclosed in the aforementiond Pat. No. 3,292,696 to Sandiford; polysacciharide B-1459 produced by the bacterium *Xanthomonas campestris*; and partially hydrolyzed and saponified polyacrylamides. Suitable shear-thickening additives include alkali metal salts of the long-chained aliphatic acids such as sodium oleate, sodium palmitate, and sodium stearate; polyvinyl alcohol-sodium borate complexes; sodium bis-(2-ethylhexyl) sulfosuccinate or other dialkyl sulfosuccinates of the type disclosed in U.S. Pat. No. 3,302,712 to H. L. Townsend et al.; and copper cetyl tolyl ether sulfonates such as disclosed in the aforementioned Pat. No. 3,315,743 to Abdo et al. It will be recognized that the above-described additives are exemplary only and that any agents may be utilized which impart shear-thinning or shear-thickening properties to water, and which are not harmful to the formation or oil therein or otherwise incompatible with the practice of the invention.

The various additives such as noted above may be added to the floodwaters in any concentration necessary to produce the desired viscosity. It usually will be desirable to provide a mobility ratio of no greater than one with respect to the reservoir oil for both the shear-thinning and shear-thickening liquids as the shear rate approaches zero. This mobility ratio M is expressed by the relationship:

$$M = \frac{K_w \times \mu_o}{K_o \times \mu_w}$$

wherein:

$K_o$ is the relative permeability to oil,
$K_w$ is the relative permeability to water,
$\mu_o$ is the viscosity of the oil, and
$\mu_w$ is the viscosity of the floodwater.

The value of $\mu_w$ needed to effect a mobility ratio of one or less typically will be within the range of about 2 to 20 centipoises but in some cases may range as high as 40 to 50 centipoises.

The concentrations of the various additives noted above necessary to produce this desired mobility ratio when the shear rate of the aqueous liquid is at or near zero typically will be within the range of about .01 to .05 percent by weight, although higher or lower concentrations may be necessary depending upon the particular additive involved and the degree of viscosity enhancement necessary. The concentrations in which an additive should be employed and its efficacy as a shear-thinning or shear-thickening agent can readily be determined through well known laboratory tests utilizing standard instruments such as a variable rotational viscosimeter.

Having described specific embodiments of the instant invention, it will be understood that further modifications thereof may be suggested to those skilled in the art, and it is intended to cover all such modifications as fall within the scope of the appended claims.

What is claimed is:

1. In the recovery of oil from a subterranean oil reservoir penetrated by spaced injection and production systems defining a recovery zone of said reservoir, the method comprising:

injecting into said reservoir via said injection system an aqueous shear-thinning liquid;

thereafter injecting into said reservoir via said injection system an aqueous shear-thickening liquid; and recovering oil from said production system.

2. The method of claim 1 wherein said shear-thinning liquid is injected until breakthrough thereof occurs at said production system.

3. The method of claim 1 wherein each of said shear-thinning and shear-thickening liquids exhibits a mobility ratio with respect to the reservoir oil of no greater than one as the shear rate approaches zero.

References Cited

UNITED STATES PATENTS

| | | | |
|---|---|---|---|
| 2,827,964 | 3/1958 | Sandiford et al. | 166—9 |
| 3,282,337 | 11/1966 | Pye | 166—9 |
| 3,292,696 | 12/1966 | Sandiford | 166—9 |
| 3,292,698 | 12/1966 | Savins | 166—9 |
| 3,302,712 | 2/1967 | Townsend et al. | 166—9 |
| 3,398,792 | 8/1968 | Abdo | 166—9 |
| 3,410,343 | 11/1968 | Abdo | 166—9 |
| 3,421,582 | 1/1969 | Fallgatter | 166—9 |

NILE C. BYERS, Jr., Primary Examiner

I. A. CALVERT, Assistant Examiner

U.S. Cl. X.R.

166—275